(12) United States Patent
Gahleitner et al.

(10) Patent No.: US 6,187,869 B1
(45) Date of Patent: Feb. 13, 2001

(54) MODIFIERS BASED ON ETHYLENES OR AMORPHOUS OLEFIN ELASTOMERS FOR REDUCING THE SURFACE TACK OF AMORPHOUS POLYPROPYLENES

(75) Inventors: Markus Gahleitner, Neuhofen; Hermann Heinemann, Kematen/Ybbs; Norbert Hafner; Christian Paulik, both of Linz, all of (AT)

(73) Assignee: Borealis G.m.b.H., Schwechat-Mannswörth (AT)

( * ) Notice: Under 35 U.S.C. 154(b), the term of this patent shall be extended for 0 days.

(21) Appl. No.: 09/295,315

(22) Filed: Apr. 21, 1999

(30) Foreign Application Priority Data

Apr. 24, 1998 (AT) .......................................... 689/98

(51) Int. Cl.[7] .............................. C08L 9/00; C08L 23/00; C08L 23/04
(52) U.S. Cl. ............................................ 525/232; 525/240
(58) Field of Search ..................................... 525/232, 240

(56) References Cited

U.S. PATENT DOCUMENTS

| 5,397,843 | 3/1995 | Lakshmanan et al. ............. 525/240 |
| 5,478,891 | 12/1995 | Lakshmanan et al. . |

FOREIGN PATENT DOCUMENTS

| 2 127 709 | 6/1971 | (DE) . |
| 0 475 307 | 3/1992 | (EP) . |
| 0 512 571 | 11/1992 | (EP) . |
| 0 527 589 | 2/1993 | (EP) . |
| 0 632 062 | 1/1995 | (EP) . |
| 0 768 338 | 4/1997 | (EP) . |
| 0 785 226 | 7/1997 | (EP) . |

*Primary Examiner*—Nathan M. Nutter
(74) *Attorney, Agent, or Firm*—Wenderoth, Lind & Ponack, L.L.P.

(57) ABSTRACT

Modifiers based on high-pressure polyethylenes or low-pressure ethylene copolymers or highly amorphous olefin elastomers or mixtures of these with polyethylenes or isotactic polypropylenes are added to highly amorphous polypropylenes to reduce their surface tack.

8 Claims, No Drawings

MODIFIERS BASED ON ETHYLENES OR AMORPHOUS OLEFIN ELASTOMERS FOR REDUCING THE SURFACE TACK OF AMORPHOUS POLYPROPYLENES

BACKGROUND OF THE INVENTION

1. Field of the Invention

This invention relates to the use of modifiers based on ethylenes or amorphous olefin elastomers for reducing the surface tack of amorphous polypropylenes.

2. Prior Art

Soft, predominantly or completely thermoplastic polyolefins are of great interest, both technically and commercially. Specifically highly amorphous polypropylenes, as known from, for example, EP-A-632062 (PCD Polymere GmbH) or EP-A-475307 (REXENE Corp.), have behavior which diverges markedly from that of conventional isotactic polypropylene. Their particular features are softness, elasticity and impact strength coupled with substantial retention of the relatively high melting point which is an inherent advantage of polypropylene (PP). This combined with the chemical makeup of the material (it is chemically inert and a pure polyolefin, containing neither halogens nor plasticizers, and therefore has extremely good environmental compatibility) opens up application sectors which are new and not hitherto accessible to PP, for example replacement of plasticized PVC or of thermoplastic elastomers.

However, these materials often have a degree of surface tack, which is felt to be a problem or hindrance in a large number of applications. The surface deposit is formed when, for example, components which increase gloss or opacity and, in addition, are tacky bleed out onto the surface of, for example, moldings or films made from materials of this type, either when they are being processed or subsequently when the parts are stored. Efforts have therefore been made to find ways of preventing this process by subsequent modification without altering the production process, and while maintaining the property profile as substantially as possible. For example, in WO 96/22327 PP a very complicated grafting process is used to reduce tack, and JP-Kokai 90/48882 and JP-Kokai 80/67779 on the one hand and DE-A 2127709 on the other mixing with styrene elastomers and organic additives, respectively. These known processes, however, are in some respects very complicated and result in only unsatisfactory or inadequate reduction in surface tack.

BRIEF SUMMARY OF THE INVENTION

Surprisingly, it has now been found that the addition of specific polyethylenes or olefin elastomers to amorphous PPs can be a particularly efficient way of reducing their surface tack.

DETAILED DESCRIPTION OF THE INVENTION

The invention accordingly provides for the use of a modifier selected from the following classes of materials:

a) high-pressure uncatalyzed ethylene homopolymers or ethylene-higher-α-olefin copolymers with a proportion of more than 90 mol % of ethylene and with a density of not more than 0.92 g/cm$^3$ (LDPE), b) low-pressure catalyzed ethylene-higher-α-olefin copolymers with a proportion of more than 75 mol % of ethylene and with a density of not more than 0.93 g/cm$^3$ (LLDPE), and c) highly amorphous olefin elastomers with an enthalpy of fusion of not more than 15 J/g, composed of copolymers of ethylene and propylene (EPR) or of terpolymers of ethylene, propylene and dienes (EPDM) having a density of not more than 0.88 g/cm$^3$, or else mixtures of these olefin elastomers with polyethylenes or with isotactic polypropylenes, where the proportion of the olefin elastomer by weight is in each case more than 50%, as a component for adding to a highly amorphous polypropylene (base polymer) with an enthalpy of fusion of not more than 40 J/g and a melt flow index of from 0.1 to 50 g/10 min, where the highly amorphous polypropylene is a homopolymer of propylene or a copolymer of propylene with one or more a-olefins and has a proportion of at least 80 mol % of propylene, for reducing surface tack.

The invention further provides a process for reducing the surface tack of highly amorphous polypropylene (base polymer) with an enthalpy of fusion of not more than 40 J/g and a melt flow index of from 0.1 to 50 g/10 min, where the highly amorphous polypropylene is a propylene homopolymer or a copolymer of propylene with one or more α-olefins and has a proportion of not less than 80 mol % of propylene, which comprises admixing modifiers selected from the following classes of materials:

a) high-pressure uncatalyzed ethylene homopolymers or ethylene-higher-α-olefin copolymers with a proportion of more than 90 mol % of ethylene and with a density of not more than 0.92 g/cm$^3$ (LDPE), b) low-pressure catalyzed ethylene-higher-α-olefin copolymers with a proportion of more than 75 mol % of ethylene and with a density of not more than 0.93 g/cm$^3$ (LLDPE), and c) highly amorphous olefin elastomers with an enthalpy of fusion of not more than 15 J/g, composed of copolymers of ethylene and propylene (EPR) or of terpolymers of ethylene, propylene and dienes (EPDM) having a density of not more than 0.88 g/cm$^3$$_1$ or else mixtures of these olefin elastomers with polyethylenes or with isotactic polypropylenes, where the proportion of the olefin elastomer by weight is in each case more than 50% into the highly amorphous polypropylenes.

The amount of the modifiers added is preferably from 5 to 60% by weight, particularly preferably from 10 to 40% by weight, based on the total amount of polymer. The highly amorphous PP used as base polymer here preferably has an enthalpy of fusion of not more than 30 J/g and a melt flow index of from 0.5 to 25 g/10 min, and is preferably a homopolymer of propylene or a copolymer of propylene with one or more α-olefins and has a proportion of at least 85 mol % of propylene.

If amorphous copolymers of propylene are used, these are preferably random copolymers or heterophasic copolymers with one or more comonomers selected from the class consisting of the C$_2$ olefins and C$_4$–C$_{10}$ olefins, particular preference being given to ethylene as comonomer. The highly amorphous PPs used as base polymers may be prepared by known processes, as described in EP 768338 A, for example. They are also commercially available, for example as Rexflex® from Huntsman.

The high-pressure polyethylene modifiers defined in (a) may likewise be prepared by known processes, for example as described in Acta Polym. 37 (1986), pages 241–247. They are also available commercially, for example as Daplen® LDPE from PCD Polymere or Novolen® LDPE from BASF.

The low-pressure polyethylene copolymers used defined in (b) may similarly be prepared by known processes, for example as described in Proc. of Metallocenes '96, Düsseldorf, pages 59–86 and 99–109. They are also available commercially, for example as Engage® from Dow or Exact® from Exxon. The highly amorphous olef in elastomers defined in (c), and the isotactic PPs and the polyethylenes used for the mixtures, may likewise be prepared by known processes, as described, for example, in Adv. Polym. Blends Alloys Technol. 2 (1989), pages 12–24. They are also available commercially, for example as Dutral® from Enichem, or Exxelor from Exxon. Isotactic PP and polyethylene are obtainable, for example, as Daplen grades, such as Daplen KD10 or Daplen 2425K from PCD Polymere. The melt index (MFI, melt flow index, or MFR, melt flow rate) was determined in accordance with ISO 1133/DIN 53735 at 230° C. and 2.16 kg. Crystallinity was determined by DSC in accordance with ISO 3146, evaluating the second heating procedure in a cycle between 10 and 190° C. with heating/cooling rates of 10 K/min. The enthalpy of fusion ($H_m$) was calculated here for the peak typical of crystalline PP and having a maximum between 140 and 170° C. Test specimens produced by injection molding (in accordance with DIN 16774 (1988) at a melt temperature of 250° C. and a mold temperature of 30° C.) were used to determine mechanical properties of the mixtures and reference materials in the tensile test at +23° C. on the F3/3 injection-molded dumbbell specimen in accordance with DIN 53457 (1981). Surface tack was measured by the following method (bleed-out test):

Injection-molded plaques (40×40×2 mm) were suspended at 100° C. in a heated cabinet, whereupon constituents causing tack migrated to the surface, forming a deposit. After 3 days surface quality was determined visually with regard to deposit formation (classification into tacky/low tack/non-tacky) and a washing procedure in cold n-hexane was carried out to quantify surface tack, by washing off the surface deposit and determining the loss in weight. To this end, a wire ring was used to suspend 5 plaques at a time in a 250 ml glass beaker in such a way that the plaques did not touch one another. A sufficient amount of n-hexane was then added to cover the plaques completely. After stirring for 5 minutes (magnetic stirrer) at room temperature the plaques were lifted out and left to drip into the beaker. The loss in weight (L) was determined after drying the sheets at about 60° C.

In many applications it is important that the reduction in surface tack according to the invention is associated with little, if any, increase in the rigidity of the base polymers, and to quantify this combined requirement use was made of a "W" factor which is defined as the product of the weight loss L measured above (in % by weight) and the modulus of elasticity (in MPa):

$$W = L \times \text{modulus of elasticity}$$

Another decisive factor for evaluating the PP modifications (base polymer plus modifier) obtained according to the invention, besides the visual evaluation, is accordingly a low weight loss in the bleed-out test and/or a W factor which is smaller than the W factor of the unmodified base polymer used.

The modified amorphous PP is preferably prepared by mixing base polymer and modifier in a kneader or mixer of conventional design at temperatures from 190 to 300° C., particularly preferably from 200 to 250° C., if desired adding conventional stabilizers and possibly nucleating agents and organic peroxides to adjust processability via controlled degradation.

EXAMPLES

Base material 1 (ELPP-H) was an ELPP homopolymer (prepared as in Example 1 of EP-A-632062) degraded as follows: the ELPP obtained as in Example 1 was cooled to below 0° C. and ground in a breaker to give a particle size of less than 3 mm. 0.1% by weight of bis(1,1-dimethylethyl) peroxyisopropylbenzene (Perkadox 14 Sfl, AKZO NOBEL), based on the amount of polymer, was then mixed in, and the mixture was melted at from 190 to 200° C. in a COLLIN twin-screw extruder with 25 mm screw diameter and extruded at an output of 2 kg/h via two round-section dies to give extrudates each measuring 3 mm. The residence time in the extruder was about 30 s. The extrudate was pelletized after it had solidified in a water bath. The ELPP was degraded in this process to an MFI of 6 g/10 min. The tensile modulus of elasticity of the material is 17 MPa, its crystallinity corresponds to an enthalpy of fusion of 19 J/g and its W factor is 95.

Base material 2 (FP-D 100) was a highly amorphous PP homopolymer, the commercial product REXFLEX FP-D 100 from REXENE Corp., with a tensile modulus of elasticity of 80 MPa, a crystallinity corresponding to an enthalpy of fusion of 37 J/g and a W factor of 534.

The following products were used as modifiers:

EPR DUTRAL PM 06 (EPR master batch based on PE; commercial product from ENI)

EPDM Royalene 7565 (EPDM master batch 79% strength based on PE; commercial product from AES)

LDPE Daplan 2425 K (LDPE; commercial product from PCD Polymere)

MCPE Engage 8100 (metallocene LLDPE; commercial product from DOW)

Talc Talkum Naintsch A 7 (inert filler; commercial product from Naintsch/Luzenac)

Examples 1 to 8 and Comparative Examples C1 to C3

The mixtures, in the compositions given in the table, were melted at from 200 to 240° C. in a COLLIN twin-screw extruder with 25 mm screw diameter and extruded at an output of 4 kg/h via two round-section dies to give extrudates each of dimension 3 mm. The residence time in the extruder was about 20 s. The extrudate was pelletized after it had solidified in a water bath.

The table also gives the MFI, modulus of elasticity, qualitative visual evaluation, weight loss and W factor of the polymers. It is clear from the reported values that both of the base polymers used (ELPP-H and FP-D 100) give higher values for both weight loss and W factor than do the mixtures modified with the various modifiers (EPR, EPDM, LPDE, MCPE=LLDPE).

TABLE

| Example | Base | Modifier Type | Modifier % by weight | MFI 230°/2.16 kg g/10 min | Tensile test Modulus of elasticity MPa | "Surface tack" Visual evaluation*) (3d/100° C.) | Loss 3d/100° C.) % by weight | W factor (L × E) % by weight × MPa |
|---|---|---|---|---|---|---|---|---|
| 1 | ELPP-H | EPR | 50 | 0.7 | 41 | B | 1.75 | 71.8 |
| 2 | ELPP-H | EPDM | 50 | 0.9 | 30 | B | 1.87 | 56.1 |
| 3 | ELPP-H | LDPE | 25 | 1.0 | 37 | B | 2.15 | 79.6 |
| 4 | ELPP-H | LDPE | 50 | 3.4 | 88 | A | 0.58 | 51.0 |
| 5 | ELPP-H | MCPE | 25 | 2.5 | 10 | B | 3.12 | 31.2 |
| 6 | ELPP-H | MCPE | 50 | 1.0 | 9 | B | 1.66 | 14.9 |
| 7 | FP-D 100 | LDPE | 25 | 13.6 | 75 | B | 2.91 | 218.3 |
| 8 | FP-D 100 | LDPE | 50 | 12.9 | 101 | A | 0.61 | 61.6 |
| C1 | ELPP-H | — | 0 | 6.0 | 17 | C | 5.59 | 95.0 |
| C2 | ELPP-H | Talc | 20 | 3.7 | 40 | C | 4.45 | 178.0 |
| C3 | FP-D 100 | — | 0 | 14.0 | 80 | C | 6.68 | 534.4 |

A = non-tacky
B = low tack
C = tacky

What is claimed is:

1. A method for reducing surface tack which comprises using a modifier selected from the following classes of materials:
   a) high-pressure uncatalyzed ethylene homopolymers or ethylene-higher-x-olefin copolymers with a proportion of more than 90 mol % of ethylene and with a density of not more than 0.92 g/cm$^3$ (LDPE),
   b) low-pressure catalyzed ethylene-higher-α-olefin copolymers with a proportion of more than 75 mol % of ethylene and with a density of not more than 0.93 g/cm$^3$ (LLDPE), and
   c) highly amorphous olefin elastomers with an enthalpy of fusion of not more than 15 J/g, composed of copolymers of ethylene and propylene (EPR) or of terpolymers of ethylene, propylene and dienes (EPDM) having a density of not more than 0.88 9/cm$^3$, or else mixtures of these olefin elastomers with polyethylenes or with isotactic polypropylenes, where the proportion of the olefin elastomer by weight is in each case more than 50%, as a component for adding to a highly amorphous polypropylene (base polymer) with an enthalpy of fusion of not more than 40 J/g and a melt flow index of from 0.1 to 50 g/10 min, where the highly amorphous polypropylene is a homopolymer of propylene or a copolymer of propylene with one or more α-olefins and has a proportion of at least 80 mol % of propylene.

2. The method as claimed in claim 1, wherein the highly amorphous polypropylene has an enthalpy of fusion of not more than 30 J/g and a melt flow index of from 0.5 to 25 g/lo min, and is a homopolymer of propylene or a copolymer of propylene with one or more α-olefins and has a portion of at least 85 mol % of propylene.

3. The method as claimed in claim 1, wherein the copolymers of propylene used are random copolymers or heterophasic copolymers with one or more comonomers selected from the class of the C$_2$ olefins and C$_4$–C$_{10}$ olefins.

4. The method as claimed in claim 3, wherein a comonomer used is ethylene.

5. The method as claimed in claim 1, wherein the amount of the modifiers present is from 5 to 60% by weight, based on the total amount of polymer.

6. The method as claimed in claim 5, wherein the amount of the modifiers present is from 10 to 40% by weight, based on the total amount of polymer.

7. The method as claimed in claim 1, wherein the "W" factor of the base polymer mixed with the modifier is smaller than the "W" factor of the unmodified base polymer.

8. A process for reducing the surface tack of highly amorphous polypropylene (base polymer) with an enthalpy of fusion of not more than 40 J/g and a melt flow index of from 0.1 to 50 g/10 min, where the highly amorphous polypropylene is a propylene homopolymer or a copolymer of propylene with one or more α-olefins and has a proportion of not less than 80 mol % of propylene, which comprises admixing modifiers selected from the following classes of materials:
   a) high-pressure uncatalyzed ethylene homopolymers or ethylene-higher-a-olefin copolymers with a proportion of more than 90 mol % of ethylene and with a density of not more than 0.92 g/cm$^3$ (LDPE),
   b) low-pressure catalyzed ethylene-higher-u-olefin copolymers with a proportion of more than 75 mol % of ethylene and with a density of not more than 0.93 g/cm$^3$ (LLDPE), and
   c) highly amorphous olefin elastomers with an enthalpy of fusion of not more than 15 J/g, composed of copolymers of ethylene and propylene (EPR) or of terpolymers of ethylene, propylene and dienes (EPDM) having a density of not more than 0.88 g/cm$^3$, or else mixtures of these olefin elastomers with polyethylenes or with isotactic polypropylenes, where the proportion of the olefin elastomer by weight is in each case more than 50% into the highly amorphous polypropylenes.

* * * * *